US012704007B2

(12) United States Patent
Rrumbullaku et al.

(10) Patent No.: US 12,704,007 B2
(45) Date of Patent: Aug. 11, 2026

(54) EMERGENCY DOOR BRAKING SYSTEM

(71) Applicant: GM Global Technology Operations LLC, Detroit, MI (US)

(72) Inventors: Besi Rrumbullaku, Rochester, MI (US); Phillip C. Storck, Washington, MI (US); Bryan Alexander Pena-Cruz, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 18/488,614

(22) Filed: Oct. 17, 2023

(65) Prior Publication Data

US 2025/0122754 A1 Apr. 17, 2025

(51) Int. Cl.
*E05C 17/00* (2006.01)

(52) U.S. Cl.
CPC .................................... *E05C 17/00* (2013.01)

(58) Field of Classification Search
CPC . E05C 17/00; B60J 5/06; E05F 15/659; E05F 15/70
USPC .......................................................... 701/36
See application file for complete search history.

(56) References Cited

U.S. PATENT DOCUMENTS

2023/0295963 A1* 9/2023 Kobayashi ............ B60K 35/10
701/36

FOREIGN PATENT DOCUMENTS

CN 106647551 A 5/2017

* cited by examiner

*Primary Examiner* — Maceeh Anwari
(74) *Attorney, Agent, or Firm* — Honigman LLP; Matthew H. Szalach

(57) ABSTRACT

An emergency door braking system for an autonomous vehicle includes a vehicle processor for storing vehicle data including door latch status and vehicle sliding door location. The emergency door braking system also includes a server communicatively coupled to the vehicle processor and configured to stop a sliding vehicle door at a predetermined vehicle sliding door location based on the door latch status.

20 Claims, 6 Drawing Sheets

EMERGENCY DOOR BRAKING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an emergency door braking system for an autonomous vehicle.

A self-driving vehicle, also known as an autonomous vehicle, is a vehicle that is capable of traveling without human input. Self-driving vehicles are responsible for perceiving the environment, monitoring important systems, and controlling the vehicle including navigation. Some autonomous vehicles forgo traditional driver and rear passenger seats in favor of a single passenger compartment. Moreover, to facilitate passenger entry into the passenger compartment, some autonomous vehicles employ one or more sliding doors.

As with most autonomous features, the sliding door is usually controlled by a vehicle server. However, if power fails in the autonomous vehicle, the autonomous vehicle often includes an emergency opening lever, for use by a passenger in opening the sliding door. However, the location of the sliding door and the emergency opening lever may create a pinch point where a vehicle passenger's hand or arm may get stuck. As such, an emergency door braking system is desired that provides for safe exit of vehicle passengers during a power-failure event.

SUMMARY

In some examples, an emergency door braking system for an autonomous vehicle includes a vehicle processor for storing vehicle data including door latch status and vehicle sliding door location. The emergency door braking system also includes a server communicatively coupled to the vehicle processor and configured to stop a sliding vehicle door at a predetermined vehicle sliding door location based on the door latch status. In some examples, the predetermined vehicle sliding door location is approximately 50% between a door-open position and a door-closed position. In some examples, the predetermined vehicle sliding door location is less than 200 Hall counts from a door-closed position. In some examples, the predetermined vehicle sliding door location is more than 100 Hall counts from a door-open position. In some examples, the server is configured to stop the sliding vehicle door by disengaging an emergency brake function of the autonomous vehicle. In some examples, an autonomous vehicle incorporates the emergency door braking system. In some examples, the autonomous vehicle further includes a plurality of sliding doors. The plurality of sliding doors may include a first sliding door and a second sliding door configured to move in opposite directions and engage one another in a door-closed position.

In some examples, an emergency door braking system for an autonomous includes a vehicle processor for storing vehicle data including door latch status and vehicle sliding door location. The emergency door braking system also includes a server communicatively coupled to the vehicle processor and configured to pause a sliding vehicle door for approximately five seconds or less at a predetermined vehicle sliding door location based on the door latch status. In some examples, the predetermined vehicle sliding door location is approximately 50% between a door-open position and a door-closed position. In some examples, the predetermined vehicle sliding door location is less than 200 Hall counts from a door-closed position. In some examples, the predetermined vehicle sliding door location is more than 100 Hall counts from a door-open position. In some examples, an autonomous vehicle incorporates the emergency door braking system. In some examples, the autonomous vehicle further includes a plurality of sliding doors. The plurality of sliding doors may include a first sliding door and a second sliding door configured to move in opposite directions and engage one another in a door-closed position.

In some examples, an emergency door braking system for an autonomous vehicle includes a vehicle processor for storing vehicle data including door latch status and vehicle sliding door location, with the vehicle sliding door location being a change in the vehicle sliding door location. The emergency door braking system also includes a server communicatively coupled to the vehicle processor and configured to determine whether an emergency condition exists based on one or more of the door latch status and the vehicle sliding door location. Additionally, the server is configured to apply a door brake to slow or stop movement of a sliding vehicle door if it is determined that the emergency condition exists based on one or more of the door latch status and the vehicle sliding door location.

Additionally, the emergency door braking system also includes a server including processor-executable instructions that are stored on at least one non-transitory tangible computer readable medium. The server is communicatively coupled to the vehicle processor and configured to execute the instructions that are stored on the at least one non-transitory tangible computer readable medium to apply a door brake to slow movement of a sliding vehicle door based on the door latch status and the vehicle sliding door location including the change in vehicle sliding door location. In some examples, the vehicle data further includes one or more of vehicle incline or vehicle door speed. The server may be additionally configured to slow movement of the sliding vehicle door based on one or more of the vehicle incline or the vehicle door speed. Additionally, in some examples, an autonomous vehicle incorporates the emergency door braking system. In some examples, the autonomous vehicle further includes a plurality of sliding doors. The plurality of sliding doors may include a first sliding door and a second sliding door configured to move in opposite directions and engage one another in a door-closed position.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
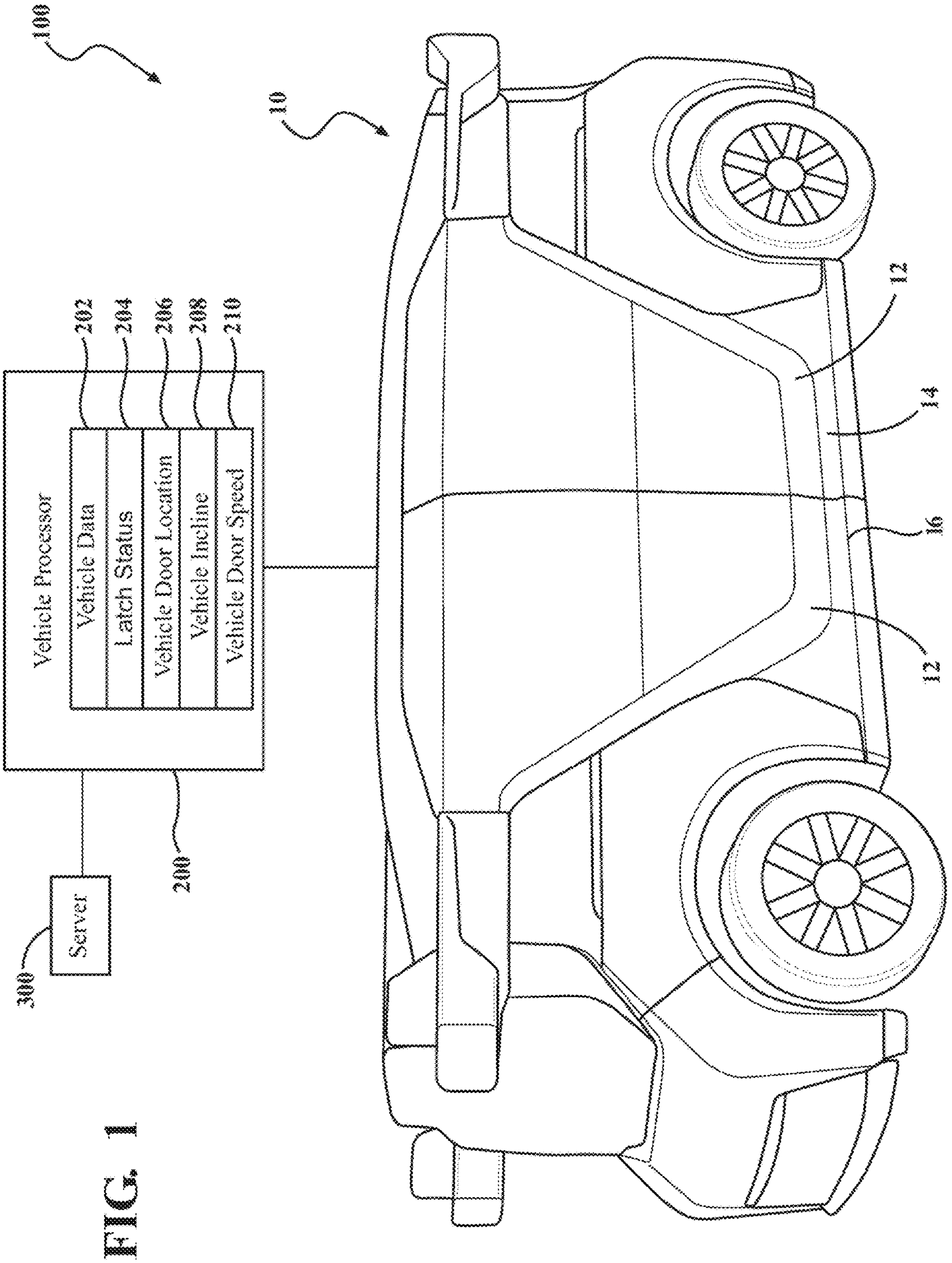
FIG. 1 is a perspective view of a vehicle having a vehicle processor in communication with a server in accordance with the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a vehicle passenger, one or more aspects of the disclosure can be implemented on a computer having a display device, e.g., a CRT (cathode ray tube), LCD (liquid crystal display) monitor, or touch screen for displaying information to the vehicle passenger and optionally a keyboard and a pointing device, e.g., a mouse or a trackball, by which the vehicle passenger can provide input to the computer. Other kinds of devices can be used to provide interaction with a vehicle passenger as well; for example, feedback provided to the vehicle passenger can be any form of sensory feedback, e.g., visual feedback, auditory feedback, or tactile feedback; and input from the vehicle passenger can be received in any form, including acoustic, speech, or tactile input. In addition, a computer can interact with a vehicle passenger by sending documents to and receiving documents from a device that is used by the vehicle passenger; for example, by sending web pages to a web browser on a vehicle passenger's client device in response to requests received from the web browser.

Referring to FIGS. 1-5B, an emergency door braking system 100 for a vehicle 10 includes a vehicle processor 200. The emergency door braking system 100 may also include a server 300, described in more detail below; communicatively coupled with the vehicle processor 200. In some examples, the vehicle 10 is a fully autonomous or self-driving vehicle such that the vehicle 10 does not require vehicle passenger input to travel. However, it is also contemplated that the vehicle 10 may be semi-autonomous, if desired. Additionally, in some examples, the vehicle 10 may be an electric vehicle 10. However, it is also contemplated that the vehicle 10 may incorporate both electric vehicle and internal combustion engine (ICE) components and capabilities. Additionally, the vehicle 10 may include only an internal combustion engine or other power source, if desired. Additionally or alternatively, the vehicle 10 may include fuel cell components and capabilities.

In some examples, the vehicle 10 includes one or more vehicle doors 12. In some examples, one or more of the vehicle doors 12 is a sliding door. A sliding door is a type of vehicle door 12 that is mounted on or suspended from a track on which the door slides, usually horizontally. In some examples, the vehicle door 12 may include a first door 14 and a second door 16. As shown in the figures, the first door 14 and the second door 16 may be disposed opposite one another. Moreover, the first door 14 and the second door 16 may be configured to move in opposite directions from one another. In the example shown in FIGS. 1 and 2, when the first door 14 and the second door 16 are both in a door-closed position, the first door 14 and the second door 16 engage one another. Additionally, when one or both of the first door 14 and the second door 16 is in a door-open position, the first door 14 and the second door 16 are disposed away from one another. While two sliding doors 14, 16 are disclosed, other configurations are contemplated including, but not limited to, a single sliding door or a series of three or more sliding doors. In some examples, one or more of the first door 14 and the second door 16 includes a latching mechanism (not shown) that is movable between a latched state and an unlatched state and configured to couple the first door 14 and the second door 16 in the door-closed position. The latching mechanism may be operated by one or more of the vehicle processor 200 and the server 300, and/or may be configured to be manually operated between the latched state and the unlatched state.

The vehicle door 12 may be a powered door or a powered-assist door such that the vehicle door 12 may move between the door-open position and the door-closed position automatically upon activation by the user and/or the server 300. In some examples, the vehicle door 12 is powered using an Electromotive Force (EMF) motor, which may be controlled by one or more of the vehicle processor 200 and the server 300. Additionally, in some examples, the first door 14 and the second door 16 are secured to one another in the door-closed position using the EMF motor as a door brake, which is constantly active during vehicle movement to prevent accidental opening of the vehicle door 12 during travel. The EMF motor may include one or more coils configured to move inside a magnetic field.

Powered vehicle doors typically use power from a vehicle to move the latching mechanism between the latched and unlatched states and to move between the door-open position and the door-closed position. However, in the case of a power failure to the vehicle 10, the vehicle 10 may also include a manual emergency latch 18 configured to be activated by the vehicle passenger to allow movement of the vehicle door 12 from the door-closed position to the door-open position, thereby allowing vehicle passengers to exit the vehicle 10. When the manual latch 18 is moved from an inactivated position to an activated position, the state of the latching mechanism is changed from the latched state to the unlatched state. The unlatched state allows the vehicle door 12 to be moved from the closed position to the open position such that vehicle passengers can exit the vehicle 10 during an emergency situation such as during a power failure event.

Figure 2:
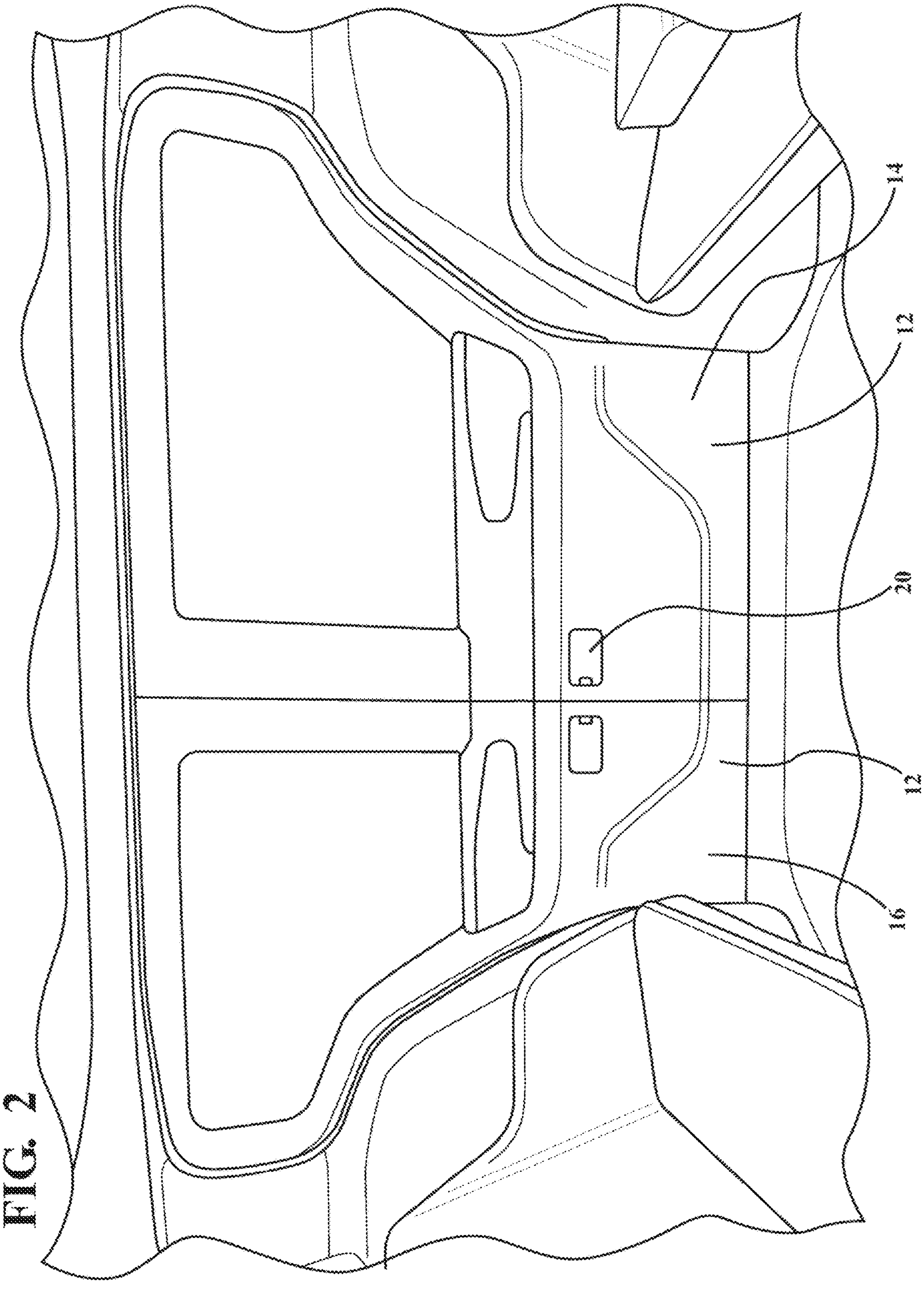
FIG. 2 is an interior view of a vehicle having an emergency door braking system according to the present disclosure.
Figure 3:
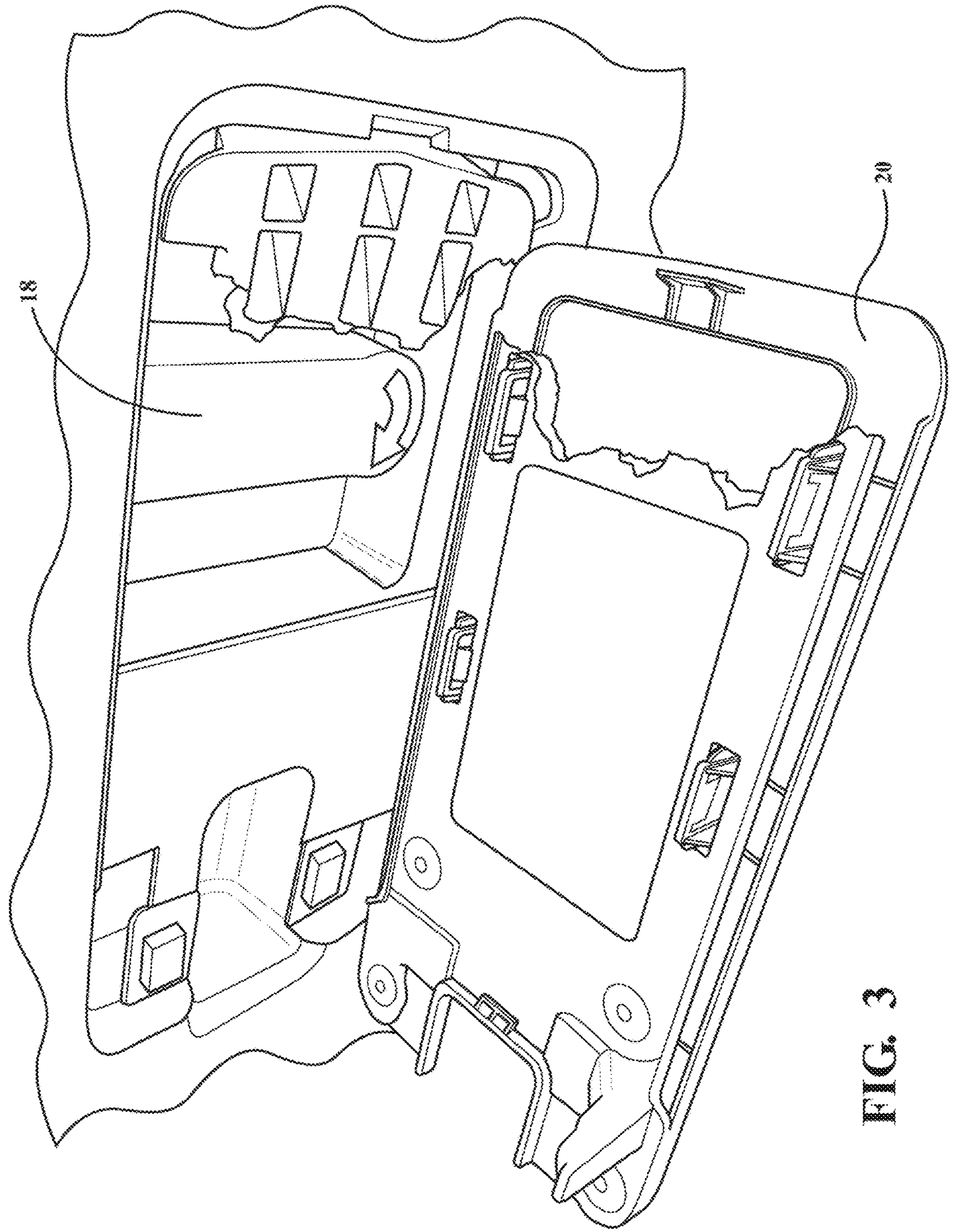
FIG. 3 is a perspective view of an emergency door release lever.
Figure 4:
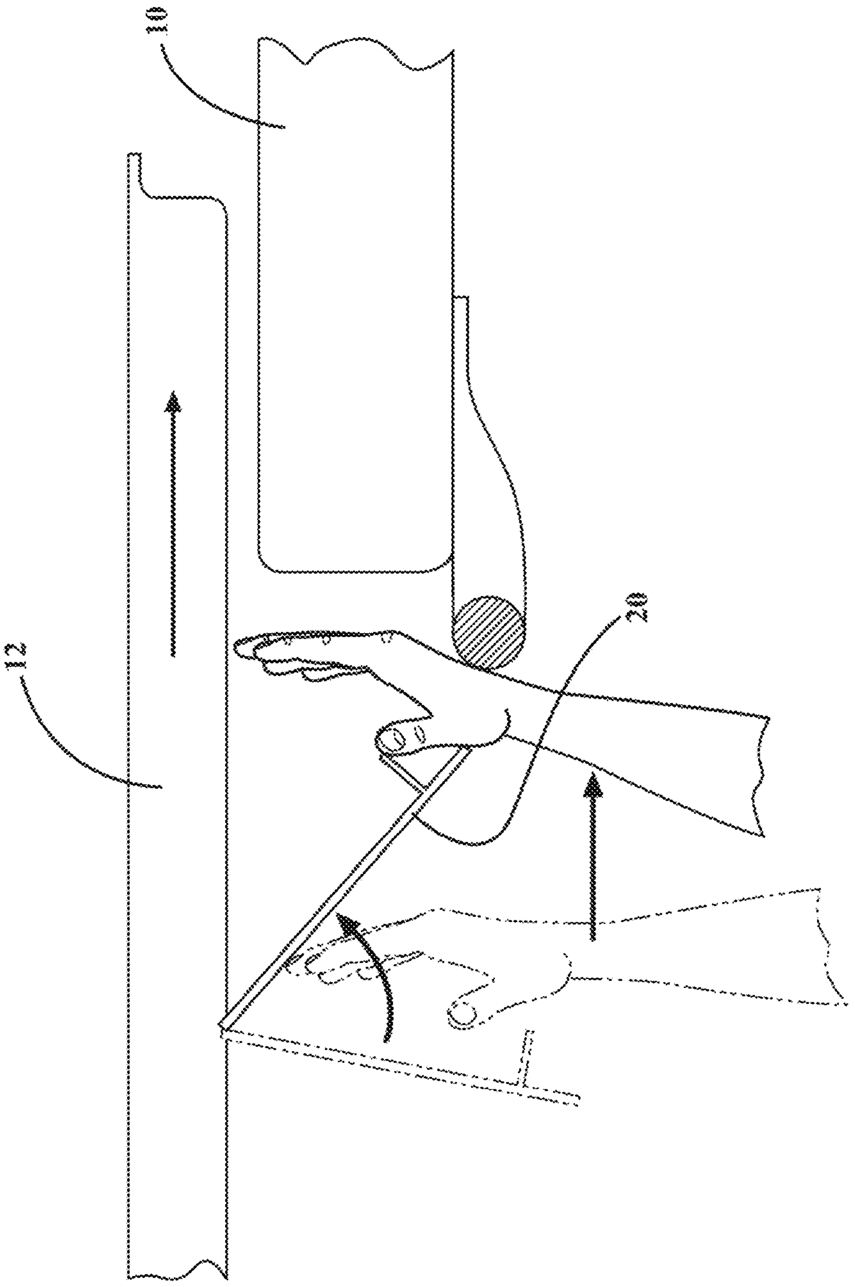
FIG. 4 is a schematic view of a vehicle passenger activating the emergency door release lever of FIG. 3.

In the example shown in FIGS. 2 and 3, the manual latch 18 is disposed within the vehicle door 12 and may be accessed by a vehicle passenger by moving a panel 20 to uncover the manual latch 18. In the example shown in FIG. 3, the panel 20 is a breakaway panel. Additionally, in some examples, the panel 20 includes a portion that rotates away from the vehicle door 12 such that access to the manual latch 18 is granted.

Referring again to the example shown in FIGS. 1-5B, the vehicle processor 200 is configured to store vehicle data 202 including door latch status 204, vehicle sliding door location 206, vehicle incline 208, and/or vehicle door speed 210. In some examples, the door latch status 204 generally pertains to data related to whether an emergency condition exists. For example, an emergency condition may include one or more of movement of the door 12 without a command from the server 300 or movement of the latch mechanism to an unlatched state without a command from the server 300. As such, the vehicle processor 200 may use one or more of vehicle cameras, vehicle sensors, or other methods to gather information related to the door latch status 204. In some examples, the data includes data from sensors or cameras configured to gather information related to if the latching mechanism of the vehicle door 12 has changed states and/or if the vehicle door 12 has moved past a predetermined threshold without command from the server 300.

Additionally, in some examples, the door latch status 204 may also include pre-curser information related to whether the emergency condition exists. In some examples, pre-curser information includes whether or not an emergency power situation, such as a vehicle power failure, has occurred. If a vehicle power failure has occurred, a vehicle passenger will need to use the manual latch 18 to open the vehicle door 12, as the powered door function will not be available. As such, the vehicle processor 200 may gather data related to an emergency power situation as a pre-cursor to the emergency condition.

Referring still to the example shown in FIGS. 1-5B, the vehicle data 202 also includes the vehicle sliding door location 206. The vehicle sliding door location 206 generally pertains to a location of the vehicle door 12 between the door-open position and the door-closed position. In some examples, the vehicle sliding door location 206 is measured as a percentage between the door-open position and the door-closed position. In other examples, the vehicle sliding door location 206 is sensed through a Hall sensor such that the vehicle sliding door location 206 is measured as a number of Hall counts from one of the door-open position or the door-closed position. However, various other data sensing devices have been contemplated. Additionally, in some examples, the vehicle sliding door location 206 is measured or sensed as a change in vehicle sliding door location from one or more of the door-closed position or the door-open position. Additionally, this change in vehicle sliding door location may be measured over a predetermined amount of time, if desired.

In some examples, the vehicle data 202 also includes the vehicle incline 208. The vehicle incline 208 generally pertains to the angle or slope at which the vehicle 10 is currently located. For example, if the vehicle 10 is disposed on a hill or other incline, the vehicle processor 200 may use sensing or measuring devices to gather information related to the angle of inclination.

Additionally, the vehicle data 202 includes the vehicle door speed 210. The vehicle door speed 210 generally pertains to the speed at which the vehicle door 12 is moving between the door-open position and the door-closed position. Vehicle door speed 210 may depend on many factors including, but not limited to, the incline of the vehicle 10 during movement of the vehicle door 12, the force applied on the vehicle door 12 by a vehicle passenger, and weather or other conditions outside of the vehicle 10. As such, to gather data related to the vehicle door speed 210, the vehicle processor 200 may use data gathered from vehicle sensors or vehicle cameras. Other sensing or data gathering components may also be employed.

With further reference to FIGS. 1-5B, the server 300 is configured as a network and/or a cloud-based system that communicates with the vehicle processor 200. Additionally, it is contemplated that the vehicle processor 200 may communicate any or all of the vehicle data 202 to the server 300 for further processing and/or evaluation in some examples. It is also contemplated that the vehicle processor 200 and/or the server 300 may continuously and/or regularly update such that the vehicle data 202 is updated in real time.

In some examples, the server 300 is configured to determine whether the emergency condition exists. Determination of whether the emergency condition exists may be based on the vehicle door location 206. For example, the vehicle processor 200 may sense or gather data related to the current vehicle door location 206 and pass that information to the server 300 where the server determines if the current vehicle door location is the same as the server's 300 last commanded location. More specifically, the vehicle processor 200 may sense movement of the vehicle door 12 into the door-closed position and pass that information to the server 300. The server 300 then checks if the current vehicle door location matches the last known location commanded by the server 300. If the current vehicle door location does not match the last known location commanded by the server 300, the server 300 may determine that an emergency condition exists (i.e., that the vehicle door 12 has been manually opened). In some examples, the server 300 may include variances for small Hall changes over time, which may be treated as a stationary door.

In addition to the foregoing, the server 300 may be configured to determine whether the emergency condition exists based on the state of the latching mechanism of the vehicle door 12. In some examples, movement of the manual latch 18 mechanically or electronically changes the latching mechanism from the latched state to the unlatched state. As such, the vehicle processor 200 and/or the server 300 is configured to monitor the latching state of the vehicle door 12 to determine if the state of the latching mechanism has been changed. If the state of the latching mechanism has been changed, the server 300 determines whether the change of state was commanded by the server 300. If the state of the latching mechanism was not commanded by the server 300, but changing of the latching state has been detected, the server 300 may determine that the emergency condition exists.

If the emergency condition exists, the server 300 may disable the door brake to allow a vehicle passenger to move the vehicle door 12 to the door-open position to allow vehicle passengers to exit the vehicle 10. However, in some examples, disabling the door brake and allowing the vehicle door 12 to move to the door-open position may present a risk of injury to the vehicle passenger. More specifically, the location of the vehicle door 12 in conjunction with the location of the manual latch 18 may create a pinch point (see FIG. 3) in which a vehicle passenger's hand or arm may get stuck while moving the vehicle door 12 to the door-open position.

To prevent injury to the vehicle passenger, in some examples, the server 300 is configured to stop and/or slow the vehicle door 12 at a predetermined vehicle sliding door location based on the door latch status 204. As described above, the door latch status 204 may pertain to whether the emergency condition exists. In some examples, the server 300 is configured to stop and/or slow the vehicle door 12 at the predetermined vehicle sliding door location when it has been determined that the vehicle door 12 has moved a predetermined amount from the closed position without command from the server 300. Additionally, in some examples, the server 300 is configured to stop and/or slow the vehicle door 12 at the predetermined vehicle sliding door location when it is determined that the state of the latching mechanism has been changed from the latched state to the unlatched state without command from the server 300.

In some examples, the predetermined vehicle sliding door location is between approximately 30%-70% between the door-open position and the door-closed position. In some examples, the predetermined vehicle sliding door location is between approximately 40%-60% between the door-open position and the door-closed position. In some examples, the predetermined vehicle sliding door location is approximately 50% between the door-open position and the door-closed position. In some examples, the predetermined vehicle sliding door location is less than approximately 300 Hall counts from the door-closed position. In some examples, the predetermined vehicle sliding door location is less than approximately 200 Hall counts from the door-closed position. In some examples, the predetermined vehicle sliding door location is more than 100 Hall counts from the door-open position. However, other predetermined vehicle door locations have also been contemplated.

Additionally, in some examples, the server 300 is configured stop to and/or slow down the vehicle door 12 by applying the door brake of the autonomous vehicle 10. For example, if an emergency condition has been met, such as the latching mechanism changing from the latched state to the unlatched state without command from the server 300, the server 300 disables the typical door braking algorithm that secures the vehicle doors 12 during vehicle operation, if not already disabled. Once the typical door braking algorithm is disabled, the server may command the EMF motor to activate the door brake at the predetermined vehicle sliding door location such that the vehicle door 12 will stop and/or slow down at the predetermined vehicle sliding door location.

In some examples, the server 300 is configured to stop and/or slow the vehicle door 12 at the predetermined vehicle sliding door location for a predetermined amount of time. In some examples, the predetermined amount of time is ten (10) seconds or less. In some examples, the predetermined amount of time is five (5) seconds or less. In some examples, the predetermined amount of time is three (3) seconds or less. In some examples, once the vehicle door 12 has been stopped for the predetermined amount of time, the vehicle door 12 is allowed to continue to move to the open position.

The server 300 may be configured to stop the vehicle door 12 at the predetermined location based at least on vehicle incline 208. For example, if the server 300 determines that the emergency condition exists, the server 300 may determine whether the vehicle 10 is on an incline, which may affect the speed of the vehicle door 12 during manual opening. If the server 300 determines that the vehicle 10 is on an incline greater than a predetermined incline, the server 300 may apply the door brake to stop and/or slow down the vehicle door 12.

Additionally, in some examples, the server 300 may be configured to employ passive braking to the vehicle door 12. As described above, the door brake may be an EMF motor. In one configuration, when a user moves the vehicle door 12 towards the open position, back or counter EMF charges the EMF motor such that after a certain amount of movement by the vehicle door 12, the EMF motor can activate the door brake using the back EMF charge and stop or slow down the vehicle door 12. In some examples, this process of charging the EMF motor, activating the door brake once charged, and then recharging the EMF motor may happen one or more times between the door-closed position and the door-open position, thereby slowing down movement of the vehicle door 12 between the door-closed position and the door-open position. In some examples, the passive braking may be activated after the server 300 has actively stopped or slowed down the vehicle door 12 at the predetermined location to continue slowed movement of the door 12 towards the open position, thereby preventing the door from slamming open. Additionally, in some examples, the passive brake may be used as an alternative to the server 300 actively stopping and/or slowing the door 12 during certain conditions such as a total power failure to the vehicle 10. Moreover, in some examples, under certain conditions, such as if the vehicle door 12 is moving at a predetermined speed for a predetermined amount of time, the passive brake may be applied. For example, if the vehicle door 12 is moving more than 160 Hall counts for 250 msecond, the passive brake may be applied to safely control the vehicle door 12.

Figure 5A:
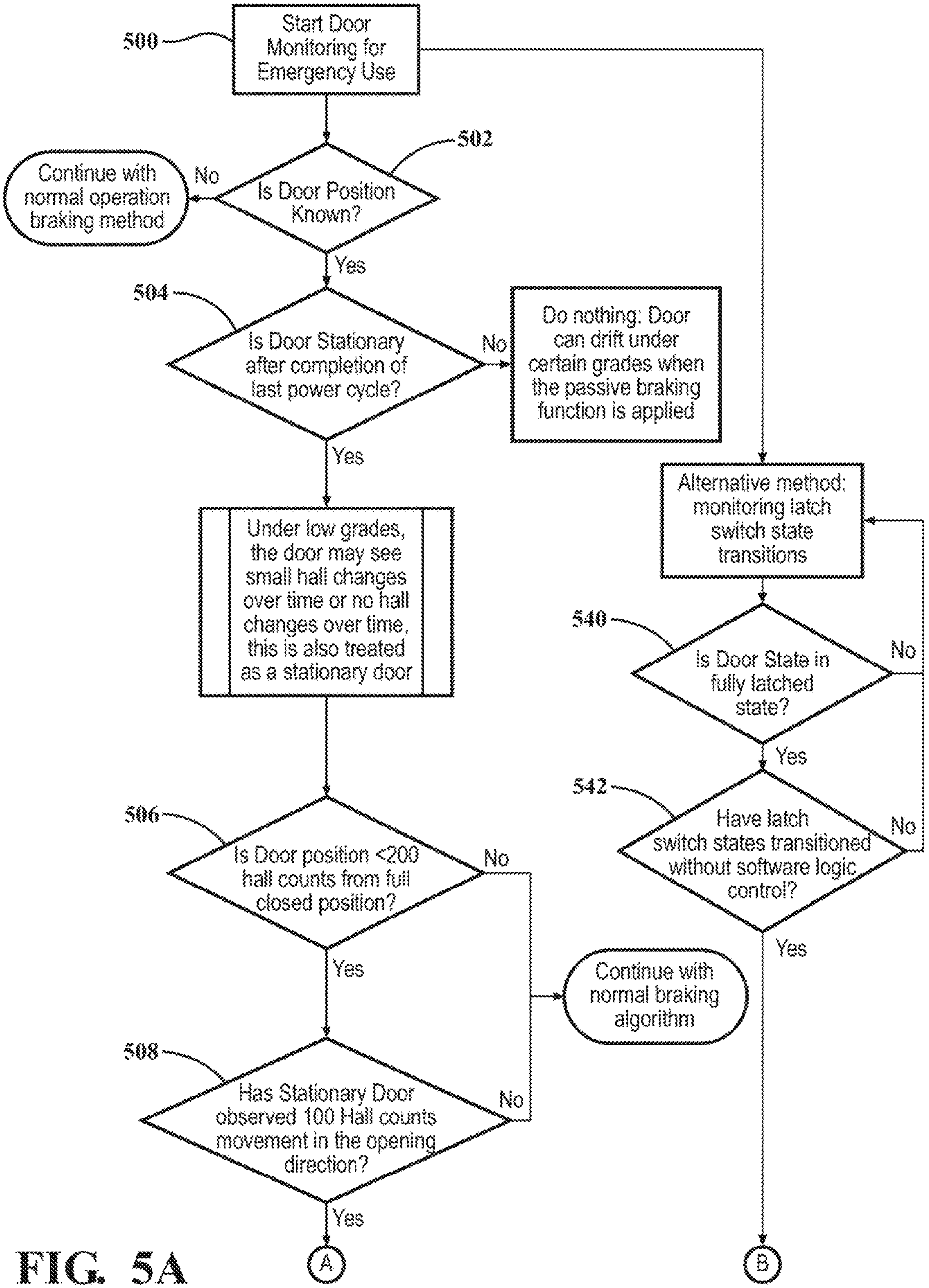
FIG. 5A is an example flow diagram of the emergency door braking system according to the present disclosure.
Figure 5B:
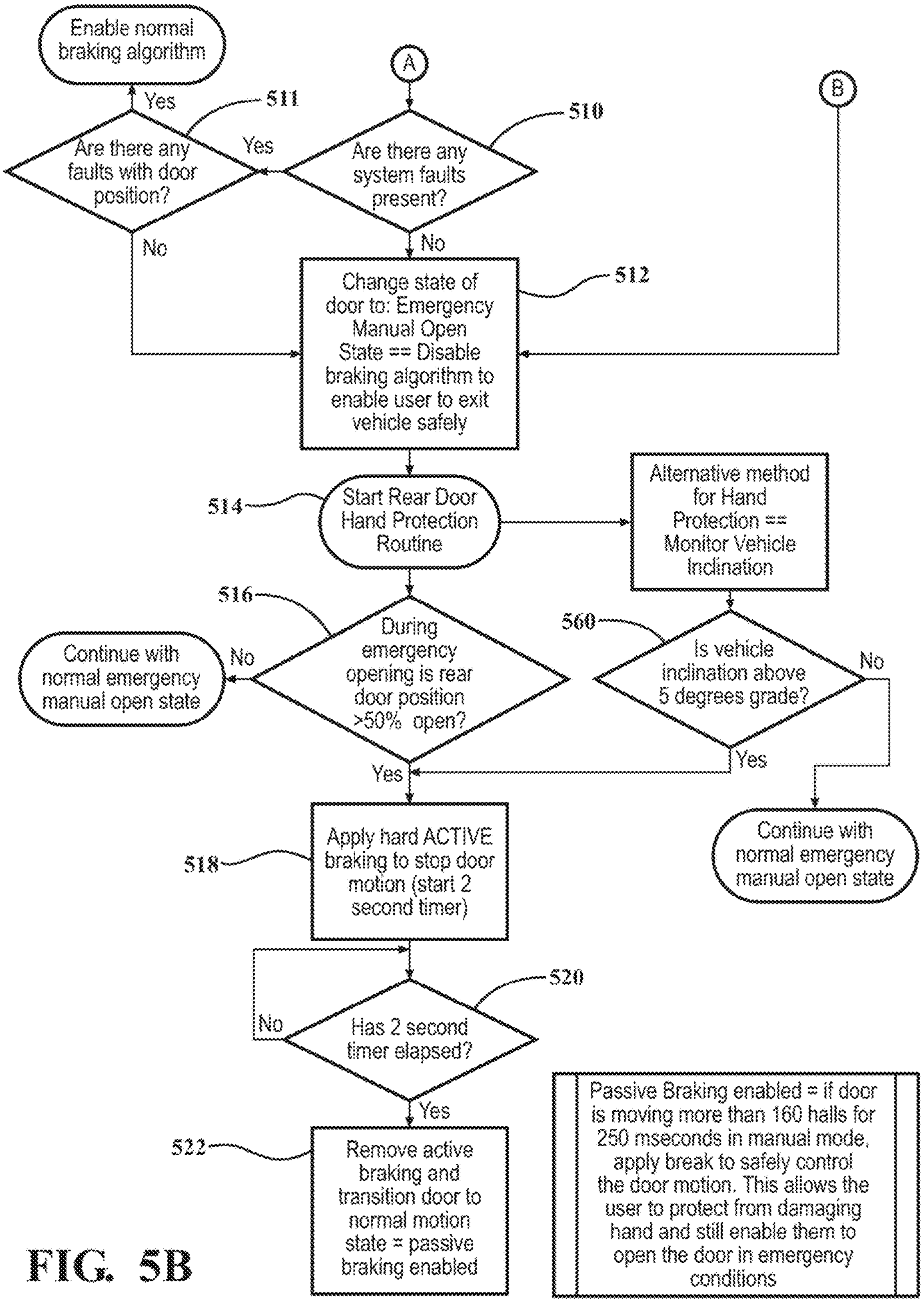
FIG. 5B is another example flow diagram of the emergency door braking system according to the present disclosure.

An example flow diagram of operations of the emergency door braking system 100 is set forth in FIGS. 5A and 5B. In an initial step at 500, shown in FIG. 5A, the vehicle 10 is turned on and the server 300 begins monitoring for emergency usage. In the next step, the server 300 determines whether the location of the vehicle door 12 is known at step 502. If the vehicle door 12 location is not known, normal operation continues. However, if the vehicle door 12 location is known, the server 300 then determines whether the vehicle door 12 is stationary after completion of the last power cycle at step 504. In other words, the server 300 determines whether the last commanded door open or door close movement has been completed. The server 300 may include a certain allowance for slight movement of the vehicle door 12 due to uneven roads or braking functions. The server 300 then determines at steps 506 and 508 whether the vehicle door 12 is at the predetermined location of approximately less than 200 Hall Counts from the door-closed position and approximately 100 Hall counts of movement towards the door-open position. If the vehicle door 12 has not reached the predetermined vehicle sliding door location, normal operations are continued. If the vehicle door 12 has reached the predetermined location, the server 300 determines whether there are any system faults present at step 510 (FIG. 5B).

If system faults are present, the server 300 determines whether there are any door faults present at step 511. If there are door faults present, the server 300 continues normal door braking operations. However, if no system or door faults have been detected, the server 300 determines there is an emergency state at step 512. This determination is based on whether the latch 18 has been activated and the server 300 is activated to stop the vehicle door 12 at the predetermined vehicle sliding door location. Additionally, the door brake—which prevents the vehicle door 12 from moving from the closed position—is disabled to allow manual opening of the vehicle door 12. In the example shown, when the emergency state is activated at step 512, the server 300 determines whether the vehicle door 12 is more than 50% towards the door-open position at step 516. If the vehicle door 12 is not more than 50% towards the door-open position, the normal manual emergency state is continued. However, if the vehicle door 12 is greater than 50% towards the door-open position, the server 300 applies the door brake to stop the vehicle door 12 at step 518. In some examples, the vehicle door 12 is stopped for approximately two (2) seconds to allow the vehicle passenger to remove their hand from the vehicle door 12 to avoid pinching or otherwise injuring the hand of the vehicle passenger at step 520. Once the two (2) seconds has elapsed, the active brake is disabled and normal emergency operations are continued at step 522.

Additionally or alternatively, the passive brake may be employed if the vehicle door 12 is moving above a predetermined speed to safely control motion of the vehicle door 12. More specifically, in some examples, during the emergency state, if the vehicle door 12 is moving at more than approximately 160 Halls per 250 msec, the door brake is activated to slow down the motion of the vehicle door 12 prior to the vehicle door 12 reaching the predetermined position. The passive brake may be activated using the back EMF of the EMF motor, as described above.

In some examples, to determine whether an emergency state has been activated, the server 300 may monitor the manual latch 18 to first determine whether the vehicle door 12 is in a fully latched state at step 540 (FIG. 5A). Next, the server 300 monitors the manual latch 18 to determine whether the manual latch 18 has been changed from the fully latched state to an unlatched state without a command from the server 300 at step 542. If the manual latch 18 has been changed from the fully latched state to an unlatched state without a command from the server 300, the emergency state is activated at step 512. In the example shown, when the emergency state is activated, the server 300 determines whether the vehicle door 12 is more than 50% towards the door-open position. If the vehicle door 12 is not more than 50% towards the door-open position, the normal manual emergency state is continued. However, if the vehicle door 12 is greater than 50% towards the door-open position, the server 300 applies an active brake to stop the vehicle door 12. In some examples, the vehicle door 12 is stopped for approximately two (2) seconds to allow the vehicle passenger to remove their hand from the vehicle door 12 to avoid pinching or otherwise injuring the hand of the vehicle passenger. Once the two (2) seconds has elapsed, the active brake is disabled and normal emergency operations are continued.

Additionally or alternatively, once the emergency state has been activated, the server 300 may be configured to use the vehicle incline 208 information to determine whether the vehicle 10 is above five (5) degrees grade at step 560. If the vehicle 10 is above five (5) degrees grade, the active brake is activated at step 518 when the vehicle door 12 is moved from the closed position. In some examples, the vehicle door 12 is stopped for approximately two (2) seconds to allow the vehicle passenger to remove their hand from the vehicle door 12 to avoid pinching or otherwise injuring the hand of the vehicle passenger. Once the two (2) seconds has elapsed, the active brake is disabled and normal emergency operations are continued including passive brake operations.

In some vehicles 10, the location of the vehicle door 12 in conjunction with the state of a manual latch 18 may create a pinch point (FIG. 3) in which a vehicle passenger's hand or arm may get stuck. The emergency door braking system 100 described herein accounts for such a situation and provides for safe exit of vehicle passengers even during a power failure event.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An emergency door braking system for an autonomous vehicle, the emergency door braking system comprising:

a vehicle processor configured to store vehicle data including door latch status and vehicle sliding door location, wherein the vehicle sliding door location is indicative of a change in the vehicle sliding door location, and wherein the door latch status includes detection of a transition of a latching mechanism from a latched state to an unlatched state without a command from a server; and the server communicatively coupled to the vehicle processor and configured to:

determine that an emergency condition exists based on one or more of the transition of the latching mechanism from the latched state to the unlatched state without a command from the server, or the change in the vehicle sliding door location not matching a last known location commanded by the server;

based on determining the emergency condition exists, apply an active door brake to stop a sliding vehicle door for a predetermined time at a predetermined vehicle sliding door location based on the door latch status; and after the predetermined time, transition control to a passive braking mode to allow continued opening at a controlled speed.

2. The emergency door braking system of claim 1, wherein the predetermined vehicle sliding door location is midway between a door-open position and a door-closed position.

3. The emergency door braking system of claim 1, wherein the predetermined vehicle sliding door location is less than 200 Hall counts from a door-closed position.

4. The emergency door braking system of claim 1, wherein the predetermined vehicle sliding door location is more than 100 Hall counts from a door-open position.

5. The emergency door braking system of claim 1, wherein the server is configured to stop the sliding vehicle door by disengaging an emergency locking function of the autonomous vehicle.

6. The emergency door braking system of claim 1, wherein the autonomous vehicle incorporates the emergency door braking system.

7. The emergency door braking system of claim 6, wherein the autonomous vehicle further includes a plurality of sliding doors.

8. The emergency door braking system of claim 7, wherein the plurality of sliding doors includes a first sliding door and a second sliding door configured to move in opposite directions and engage one another in a door-closed position.

9. An emergency door braking system for an autonomous vehicle, the emergency door braking system comprising:
- a vehicle processor configured to store vehicle data including door latch status and vehicle sliding door location, wherein the vehicle sliding door location is indicative of a change in the vehicle sliding door location, and wherein the door latch status includes detection of a transition of a latching mechanism from a latched state to an unlatched state without a command from a server; and
- the server communicatively coupled to the vehicle processor and configured to:
  - determine that an emergency condition exists based on one or more of the transition of the latching mechanism from the latched state to the unlatched state without a command from the server, or the change in the vehicle sliding door location not matching a last known location commanded by the server; and
  - based on determining the emergency condition exists, pause a sliding vehicle door for five seconds or less at a predetermined vehicle sliding door location.

10. The emergency door braking system of claim 9, wherein the predetermined vehicle sliding door location is midway between a door-open position and a door-closed position.

11. The emergency door braking system of claim 9, wherein the predetermined vehicle sliding door location is less than 200 Hall counts from a door-closed position.

12. The emergency door braking system of claim 9, wherein the predetermined vehicle sliding door location is more than 100 Hall counts from a door-open position.

13. The emergency door braking system of claim 9, wherein the autonomous vehicle incorporates the emergency door braking system.

14. The emergency door braking system of claim 13, wherein the autonomous vehicle further includes a plurality of sliding doors.

15. The emergency door braking system of claim 14, wherein the plurality of sliding doors includes a first sliding door and a second sliding door configured to move in opposite directions and engage one another in a door-closed position.

16. An emergency door braking system for an autonomous vehicle, the emergency door braking system comprising:
- a vehicle processor configured to store vehicle data including one or more of door latch status or vehicle sliding door location, wherein the vehicle sliding door location is indicative of a change in the vehicle sliding door location without a command from a server; and
- the server communicatively coupled to the vehicle processor and configured to:
  - determine whether an emergency condition exists based on one or more of the door latch status or the vehicle sliding door location not matching a last known location commanded by the server; and
    - apply a door brake to slow or stop movement of a sliding vehicle door if it is determined that the emergency condition exists based on one or more of the door latch status and the vehicle sliding door location not matching a last known location commanded by the server.

17. The emergency door braking system of claim 16, wherein:
- the vehicle data further includes one or more of vehicle incline or vehicle door speed; and
- the server is also configured to slow movement of the sliding vehicle door based also on one or more of the vehicle incline or the vehicle door speed.

18. The emergency door braking system of claim 16, wherein the autonomous vehicle incorporates the emergency door braking system.

19. The emergency door braking system of claim 18, wherein the autonomous vehicle further includes a plurality of sliding doors.

20. The emergency door braking system of claim 19, wherein the plurality of sliding doors includes a first sliding door and a second sliding door configured to move in opposite directions and engage one another in a door-closed position.

* * * * *